(12) United States Patent
Bittar et al.

(10) Patent No.: US 11,169,297 B2
(45) Date of Patent: Nov. 9, 2021

(54) CROSS-SLOT BOBBIN AND ANTENNA SHIELD FOR CO-LOCATED ANTENNAS

(71) Applicant: Halliburton Energy Services, Inc., Houston, TX (US)

(72) Inventors: Michael Bittar, Houston, TX (US); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 104 days.

(21) Appl. No.: 16/484,072

(22) PCT Filed: Sep. 14, 2018

(86) PCT No.: PCT/US2018/051024
§ 371 (c)(1),
(2) Date: Aug. 6, 2019

(87) PCT Pub. No.: WO2020/055417
PCT Pub. Date: Mar. 19, 2020

(65) Prior Publication Data
US 2020/0363558 A1 Nov. 19, 2020

(51) Int. Cl.
*G01V 3/20* (2006.01)
*H01Q 1/04* (2006.01)
*H01Q 7/00* (2006.01)

(52) U.S. Cl.
CPC ............... *G01V 3/20* (2013.01); *H01Q 1/04* (2013.01); *H01Q 7/00* (2013.01)

(58) Field of Classification Search
None
See application file for complete search history.

(56) References Cited

U.S. PATENT DOCUMENTS

| 6,566,881 B2 | 5/2003 | Omeragic et al. |
| 8,264,228 B2 * | 9/2012 | Bittar ............... G01V 3/28 324/338 |

(Continued)

FOREIGN PATENT DOCUMENTS

| WO | 2017065722 | 4/2017 |
| WO | 2018132085 | 7/2018 |
| WO | 2018132086 | 7/2018 |

OTHER PUBLICATIONS

ISRWO International Search Report and Written Opinion for PCT/US2018/051024 dated Jun. 14, 2019.

(Continued)

*Primary Examiner* — Douglas X Rodriguez
(74) *Attorney, Agent, or Firm* — Benjamin Ford; C. Tumey Law Group PLLC

(57) ABSTRACT

A logging tool includes a mandrel having an axis, a bobbin positioned about the circumference of the mandrel, and defining a first cross slot at a first slot angle and a second cross slot at a second slot angle opposite the first slot angle. The first and second cross slots intersect each other. The tool includes a first antenna in the first slot and including a first plurality of windings wrapped about the mandrel, a second antenna co-located with the first antenna and in the second slot, and an antenna shield secured to the tool mandrel and in each of the first and second slots. The first antenna is arranged in a first orientation and at a first winding angle. The second antenna is arranged in a second orientation and at a second winding angle.

22 Claims, 16 Drawing Sheets

(56) References Cited

U.S. PATENT DOCUMENTS

| | | |
|---|---|---|
| 2010/0244841 A1 | 9/2010 | Wang |
| 2010/0277176 A1 | 11/2010 | Homan et al. |
| 2011/0074427 A1 | 3/2011 | Wang et al. |
| 2011/0316542 A1 | 12/2011 | Frey et al. |
| 2013/0191028 A1* | 7/2013 | Homan .................... G21F 3/00 702/7 |
| 2017/0269254 A1 | 9/2017 | Ma et al. |
| 2017/0299760 A1 | 10/2017 | Ma et al. |

OTHER PUBLICATIONS

Schlumberger, GeoSphere, Reservoir Mapping-While-Drilling Service, 2018.
Martin Bedrock and Darren Moody, The Deployment of an Azimuthal Resistivity Tool for Geosteering, 2010.

* cited by examiner

CROSS-SLOT BOBBIN AND ANTENNA SHIELD FOR CO-LOCATED ANTENNAS

FIELD

The present description relates, in general, to wellbore logging tools including co-located loop antennas and, in particular, to wellbore logging tools including co-located loop antennas disposed in a cross-slot bobbin for minimizing loss of electromagnetic fields of the co-located loop antennas.

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) tools, which aid in making operational decisions, and logging-while-drilling (LWD) tools, which help characterize the formations. LWD tools in particular may obtain measurements of the subterranean formations being penetrated by determining the electrical resistivity (or its inverse, conductivity) of the subterranean formations, where the electrical resistivity indicates various geological features of the formations. These resistivity measurements may be taken using one or more antennas coupled to or otherwise associated with the wellbore logging tools.

The wellbore logging tool may include loop antennas each formed from multiple turns of a conductive wire (or coil) wound on an axial section of the wellbore logging tool, such as a drill collar. The wellbore logging tools often are subject to severe mechanical impacts with the borehole wall and with cuttings in the borehole fluid. These impacts may damage the loop antennas (and other components of the tool) if unprotected. Antenna shields are commonly used to physically protect the loop antennas.

Figure 1:
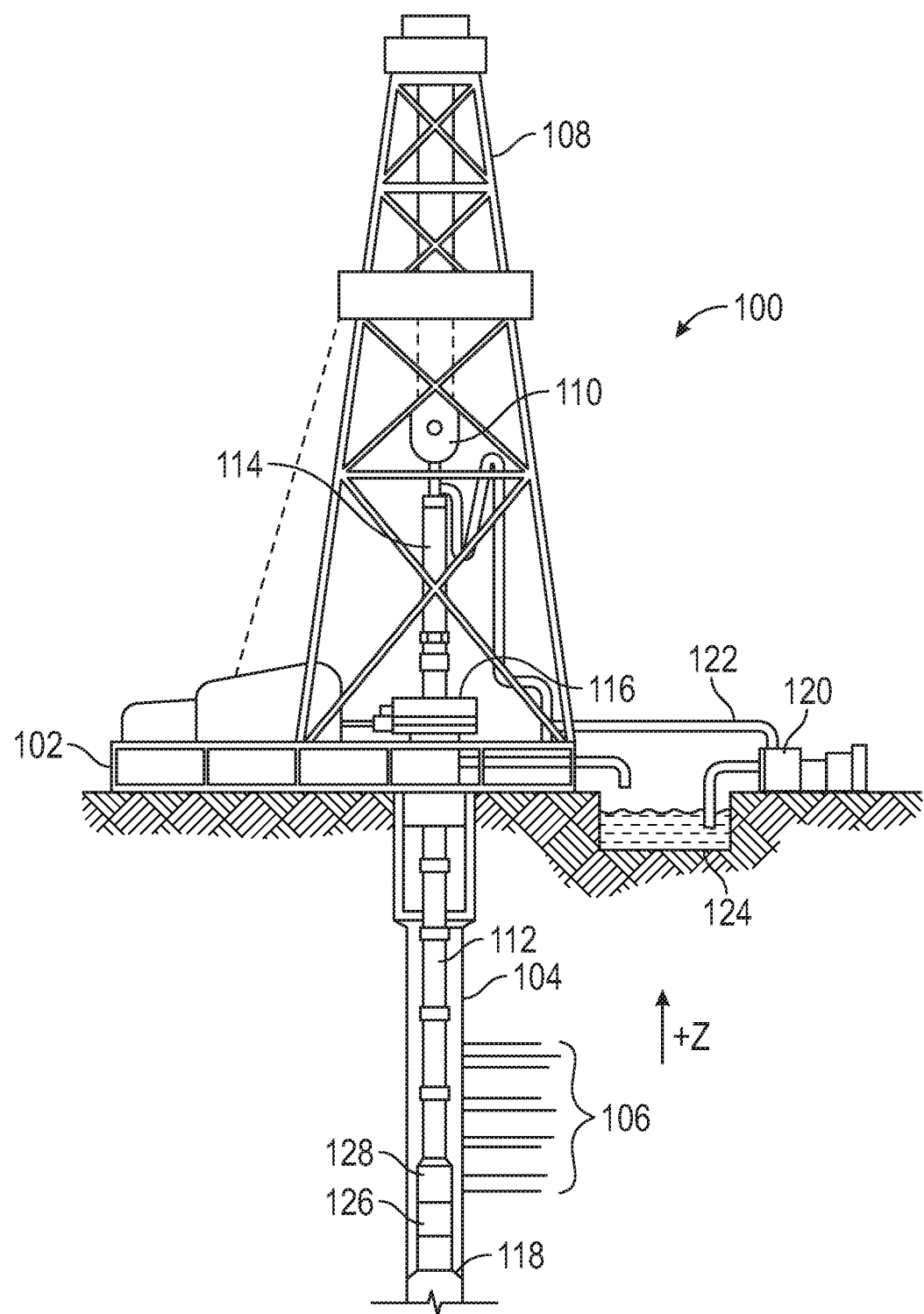
FIG. 1 is a schematic diagram of an example drilling system that may employ the principles of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The present description relates, in general, to wellbore logging tools used in the oil and gas industry and, more particularly, to wellbore logging tools including co-located loop antennas disposed in a cross-slot bobbin for minimizing loss of electromagnetic fields of the co-located loop antennas.

The wellbore logging tool, for example, a resistivity logging tool, includes one or more loop antennas at least partially overlapping each other and each formed by winding multiple turns of a coil about the tool mandrel. This overlapping arrangement of the loop antennas may be referred to as co-located antennas. Each loop antenna can include any number of consecutive "turns" (i.e. windings of coil) about the resistivity logging tool, but typically will include at least a plurality (i.e. two or more) consecutive full turns, with each full turn extending 360° about the resistivity logging tool. Each loop antenna may be "tilted" or otherwise oriented at an angle relative to the longitudinal axis of the tool, and the two loop antennas may be have opposite orientations. In order to minimize cross-talk between the co-located antennas, each loop antenna may be tilted at a loop angle of about 45° in opposite directions relative to the tool axis. However, the loop angle is not limited in this regard, and the antennas may be disposed at a loop angle greater than 0° and less than 90° relative to the tool axis, without departing from the scope of the disclosure.

The antenna shield is a cylindrical structure that axially spans the portion of the resistivity logging tool including the co-located antennas and covers the co-located antennas to protect the co-located antennas from mechanical impacts. In order to permit the EM fields to penetrate the antenna shield, and thereby facilitate electromagnetic transmissivity of the antenna shield, a plurality of slots (or openings) may be defined in the body of the antenna shield.

In one or more embodiments, resistivity logging tools include a single loop antenna wrapped about the mandrel of the resistivity logging tool and tilted relative to the tool axis. An antenna shield may be positioned radially outward from the loop antenna. The antenna shield may cover the loop antenna to provide protection. The antenna shield may define a set of longitudinal slots including a plurality of longitudinal slots for permitting EM field to penetrate the antenna shield to be transmitted or received. Each slot may be a through hole in the antenna shield that is separated from an angularly adjacent slot. The slots can be arranged along the radially adjacent loop antenna and overlap the loop antenna and are formed in the antenna shield such that each slot extends perpendicular to the radially adjacent loop antenna at any given angular location about the circumference of the tool mandrel. The slots trace the loop antenna. Stated otherwise, the centers of the slots may lie in a plane that is at an angle offset from the tool axis. An antenna shield for tilted co-located antennas can include a set of longitudinal slots for each co-located antenna.

During operation of the resistivity logging tool including co-located antennas covered by an antenna shield having longitudinal slots perpendicular to the radially adjacent loop antenna, a portion of the EM field of one loop antenna may "sneak" out or otherwise leak from the longitudinal slots of the other loop antenna of the co-located antennas. As a result, the effective EM field angle of the co-located loop antennas may be reduced. For instance, if each loop antenna is disposed having a loop angle of about 45°, the effective EM field angle of the co-located antenna would be around 33°. The EM field angle may be referred to as an "effective" EM field angle since the EM field angle is different from the loop angle (45°, in this case). Because of the leaking of the EM fields, there is cross talk between the co-located antennas, and the sensitivity of the resistivity logging tool may be reduced.

Embodiments disclosed are directed to resistivity logging tools monitoring surrounding subterranean formations adjacent a drilled wellbore and including co-located loop antennas. Each loop antenna is arranged in a slot of a cross-slot bobbin of the resistivity logging tools and covered by a corresponding antenna shield that defines a plurality of slots extending perpendicular to the windings of the loop antenna. Because the loop antennas are arranged in slots, the EM field of one loop antennas is limited from leaking out of the longitudinal slots of the antenna shield of the other loop antenna. Thus, EM field leakage is minimized and gain, sensitivity, and efficiency of the loop antennas is improved. Although embodiments disclosed are discussed with reference to two co-located loop antennas each located in a respective cross slot in the cross-slot bobbin, the number of co-located loop antennas and number of cross slots is not limited in this regard. The principles of the present disclosure are equally applicable to embodiments including three or more co-located loop antennas and three or more cross slots, without departing from the scope of the disclosure.

FIG. 1 is a schematic diagram of an example drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise a cross-slot bobbin according to embodiments disclosed.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. The measurements from the BHA including the resistivity logging tool 126 may be processed downhole and the results may be communicated to the surface receiver. Additionally or alternatively, the measurements may be communicated to the surface receiver for processing. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
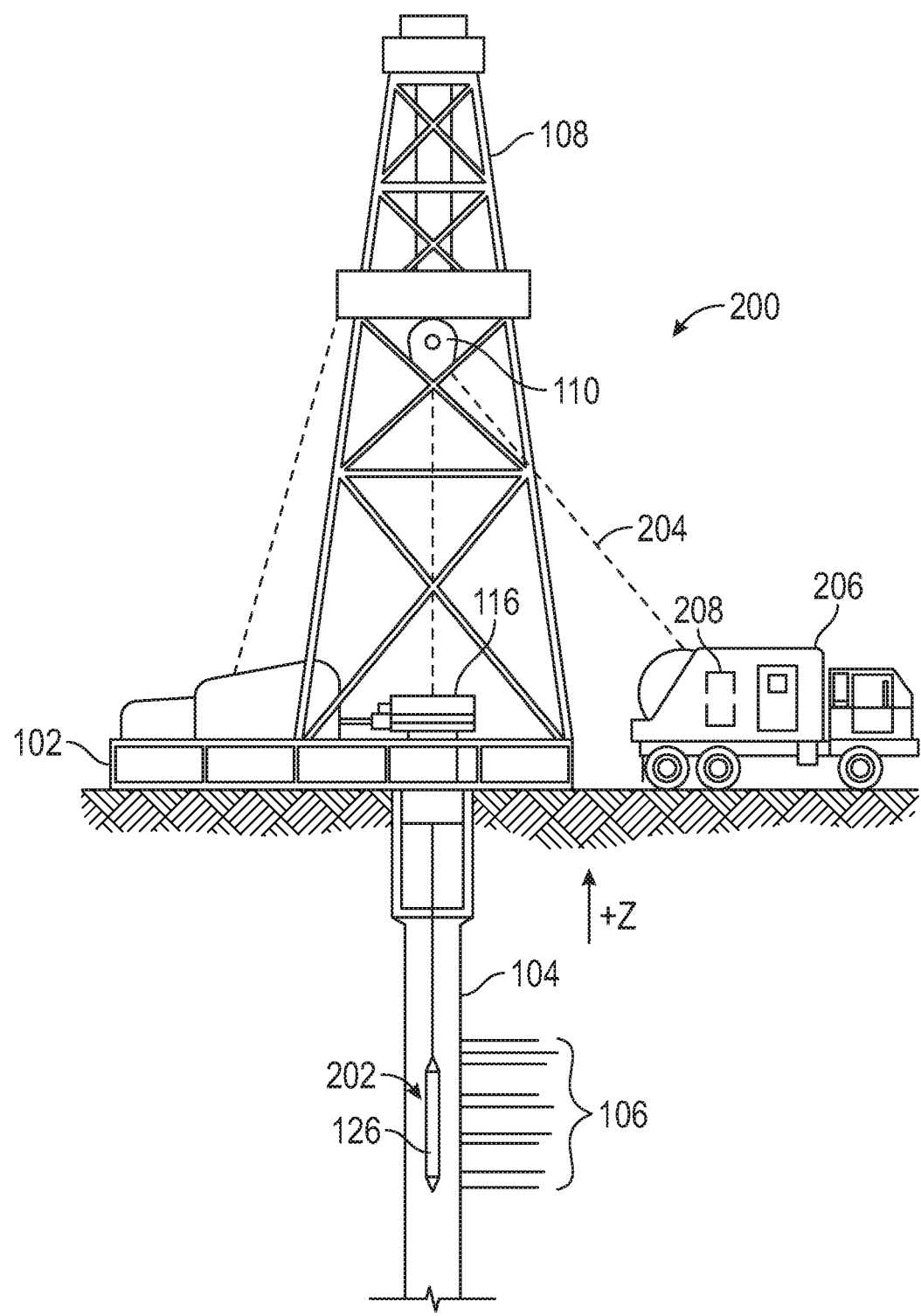
FIG. 2 is a schematic diagram of an example wireline system that may employ the principles of the present disclosure.

At various times during the drilling process, the drill string 112 may be removed from the wellbore 104, as shown in FIG. 2, to conduct measurement/logging operations. More particularly, FIG. 2 is a schematic diagram of an example wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended in the wellbore 104 on a cable 204. The sonde 202 may include the resistivity logging tool 126 described above, which may be communicably coupled to the cable 204. The cable 204 may include conductors for transporting power to the sonde 202 and also facilitate communication between the surface and the sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing and data acquisition systems 208 may be communicably coupled to the resistivity logging tool 126 by way of the cable 204.

Even though FIGS. 1 and 2 depict the systems 100 and 200 including vertical wellbores, it should be understood by those skilled in the art that principles of the present disclosure are equally well suited for use in wellbores having other orientations including horizontal wellbores, deviated wellbores, slanted wellbores or the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIGS. 1 and 2 depict an onshore operation, it should be understood by those skilled in the art that principles of the present disclosure are equally well suited for use in offshore operations, wherein a volume of water may separate the drilling platform 102 and the wellbore 104.

Figure 3A:
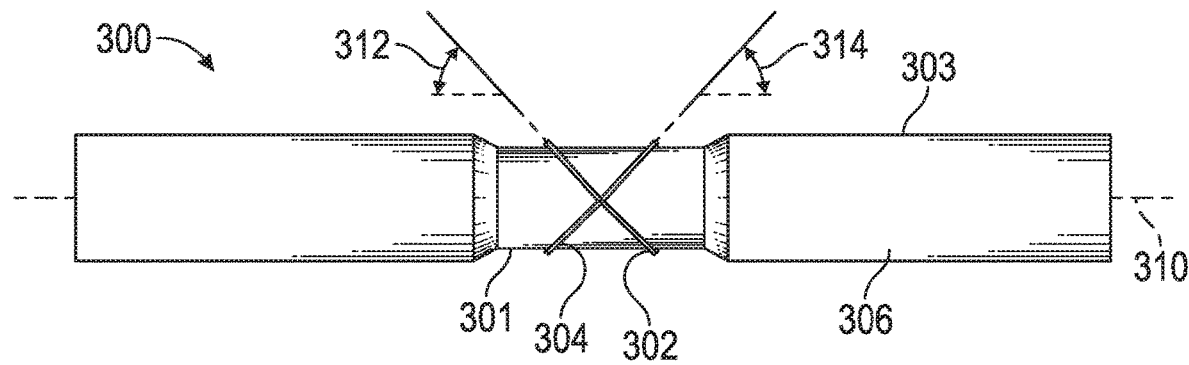
FIG. 3A schematically illustrates a resistivity logging tool including two co-located loop antennas, according to embodiments disclosed.

FIG. 3A schematically illustrates a resistivity logging tool 300 including two co-located loop antennas 302, 304, according to embodiments disclosed. The resistivity logging tool 300 is depicted as including the two co-located loop antennas 302 and 304 positioned about a tool mandrel 306, such as a drill collar or the like. In one or more embodiments, e.g. as illustrated, the co-located loop antennas 302 and 304 are wrapped about the tool mandrel 306, more particularly, within a saddle 301 defined on the tool mandrel 306. The saddle 301 may comprise a portion of the tool mandrel 306 that exhibits a reduced-diameter as compared to the remaining portions of the tool mandrel 306.

Each loop antenna 302 and 304 can include any number of consecutive "turns" (i.e. windings of coil) about the tool mandrel 306, but typically will include at least a plurality (i.e. two or more) consecutive full turns, with each full turn extending 360° about the tool mandrel 306. In some embodiments, a pathway for receiving each loop antenna 302 and 304 may be formed in the saddle 301 and along the outer surface 303 of the tool mandrel 306. For example, one or more grooves or channels may be defined on the outer surface 303 of the tool mandrel 306 to receive and seat a respective loop antenna 302 and 304 308. In other embodiments and as illustrated, however, the outer surface 303 may be smooth or even. The loop antennas 302 and 304 can be concentric or eccentric relative to a tool axis 310 of the tool mandrel 306.

As illustrated, a portion of the turns or windings of each loop antenna 302 and 304 may extend about the tool mandrel 306 at a respective winding angle 312 and 314 offset relative to the tool axis 310. More specifically, the windings of the loop antennas 302 and 304 on opposing sides of the tool mandrel 306 extend about the outer surface 303 at the respective winding angles 312 and 314. The windings, however, transition to perpendicular to the tool axis 310 at the top and bottom of the tool mandrel 306, at which point the windings transition back to the respective winding angles 312 and 314 on opposing sides of the tool mandrel 306. Successive windings of the loop antennas 302 and 304 (i.e., one or more successive revolutions of coils of the antennas) advance in a generally axial direction along at least a portion of the outer surface of the tool mandrel 306 such that loop antennas 302 and 304 each spans an axial length of the tool mandrel.

In the illustrated embodiment, the each winding angle 312 and 314 is about 45°. With winding angles 312 and 314 of about 45°, the loop antennas 302 and 304 are substantially perpendicular to each other. As used herein, the phrase "substantially perpendicular" refers to a 90° relative offset between two components, but also encompasses a +/−10° offset from a truly perpendicular relationship, without departing from the scope of the disclosure. In such a configuration, the loop antennas 302 and 304 have the least amount of cross-talk between each other. Thus, interference between the loop antennas 302 and 304 is substantially reduced, even though the loop antennas 302 and 304 are co-located.

Figure 3B:
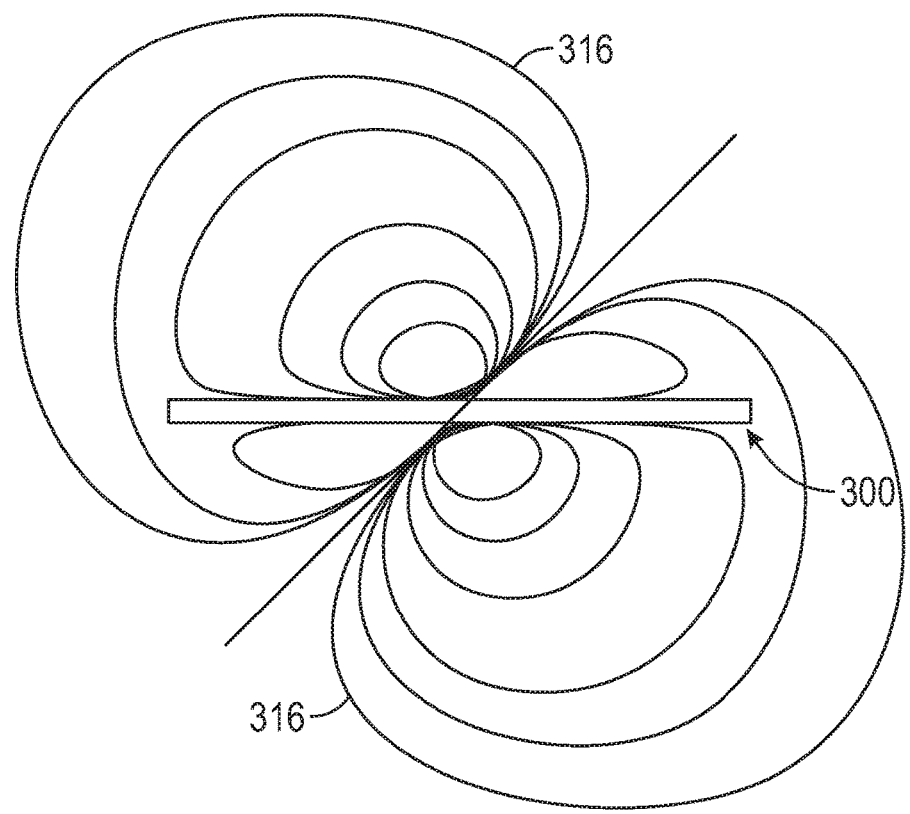
FIG. 3B illustrates a dipole electromagnetic (EM) field generated when current is passed through one of the loop antenna of the resistivity logging tool in FIG. 3A.
Figure 3C:
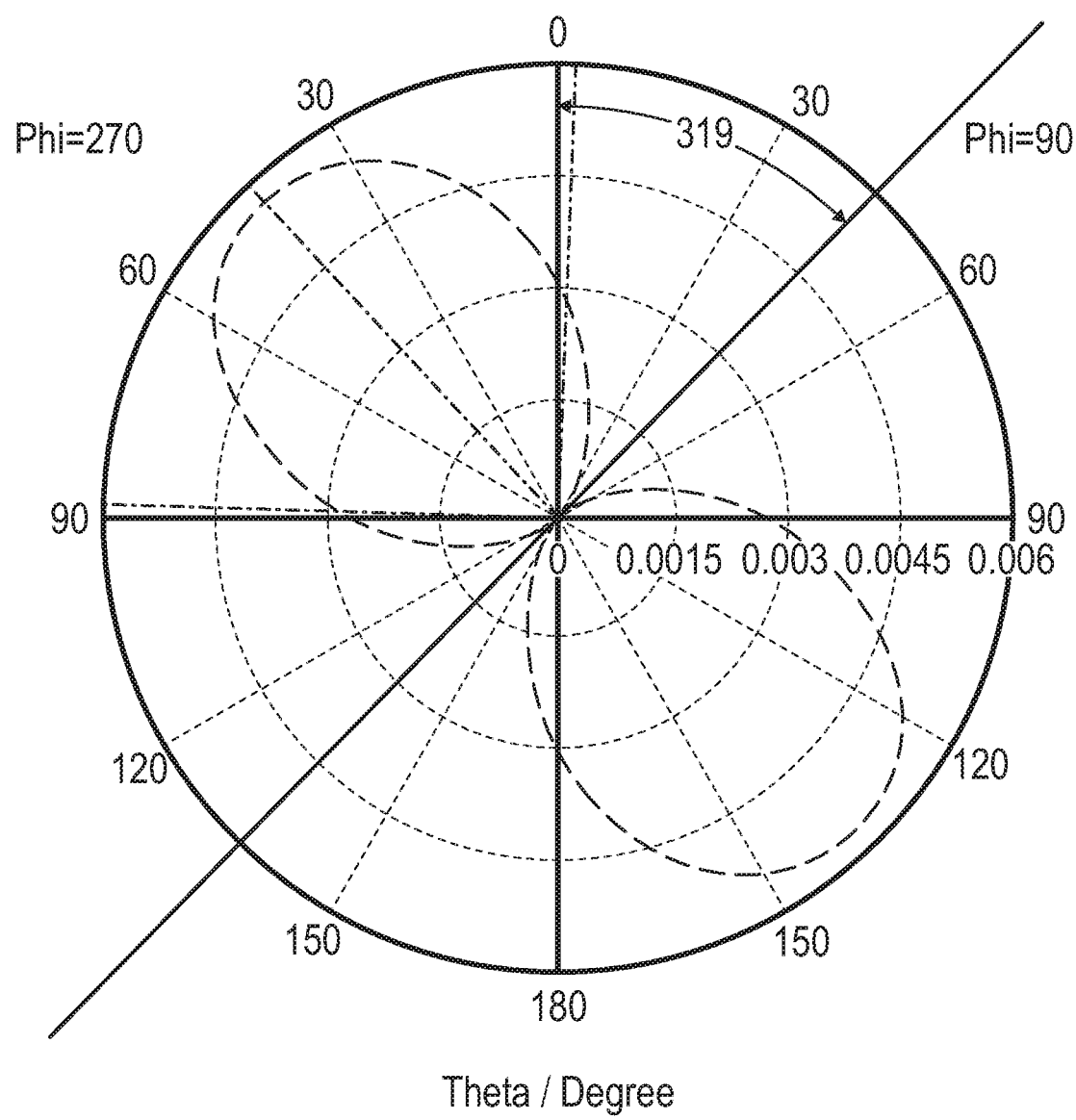
FIG. 3C is a graph illustrating the directionality of the dipole EM field in FIG. 3B in the absence of an antenna shield.

FIG. 3B illustrates a dipole electromagnetic (EM) field 316 that may be generated when current is passed through the loop antenna 302. The dipole EM field 316 may extend radially outward from the loop antenna 302 and orthogonal to the winding direction. FIG. 3C is a graph illustrating the directionality of the dipole EM field 316 in the absence of an antenna shield. As illustrated, the effective EM field angle 319 of the dipole EM field 316 is about 45°, which is close to the ideally desired angle of 45°.

Figure 3D:
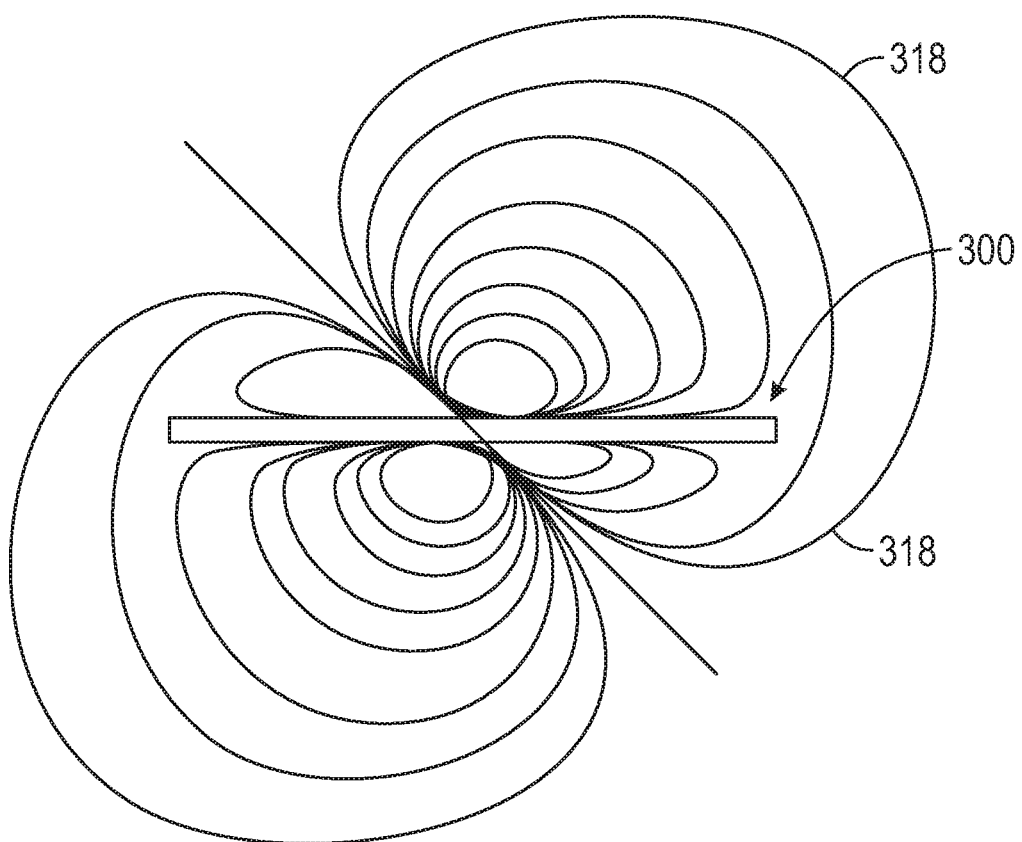
FIG. 3D illustrates a dipole EM field generated when current is passed through the other loop antenna of the resistivity logging tool in FIG. 3A.
Figure 3E:
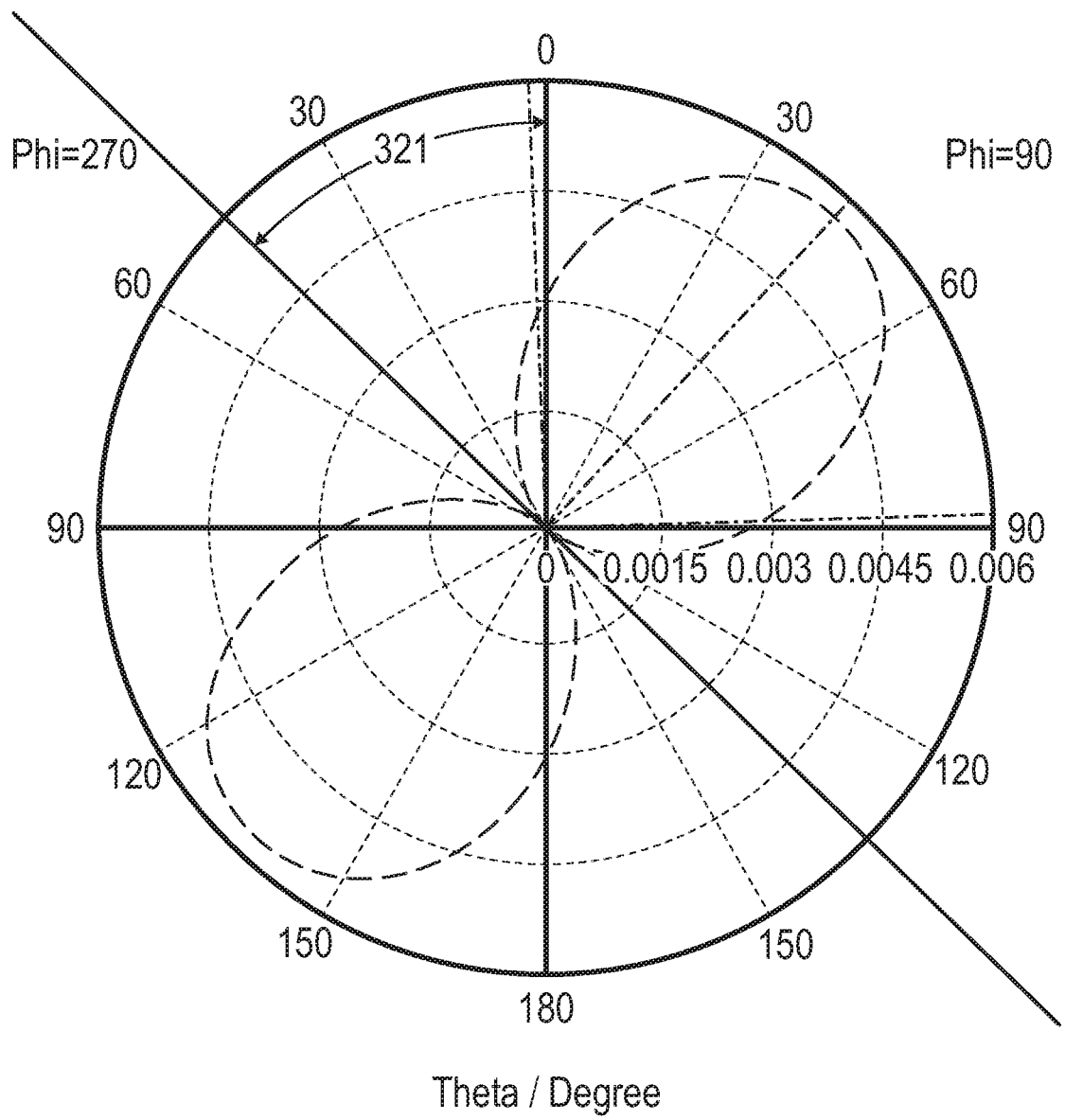
FIG. 3E is a graph illustrating the directionality of the dipole EM field in FIG. 3D in the absence of an antenna shield.

FIG. 3D illustrates a dipole EM field 318 that may be generated when current is passed through the loop antenna 304. The dipole EM field 318 may extend radially outward from the loop antenna 304 and orthogonal to the winding direction. FIG. 3E is a graph illustrating the directionality of the dipole EM field 318 in the absence of an antenna shield. As can be seen, the effective EM field angle 321 of the dipole EM field 318 is about 45°, which is close to the ideally desired angle of 45°. From FIGS. 3B-3E, it can be understood that the loop antennas 302 and 304 have minimal cross-talk between each other.

Figure 4A:
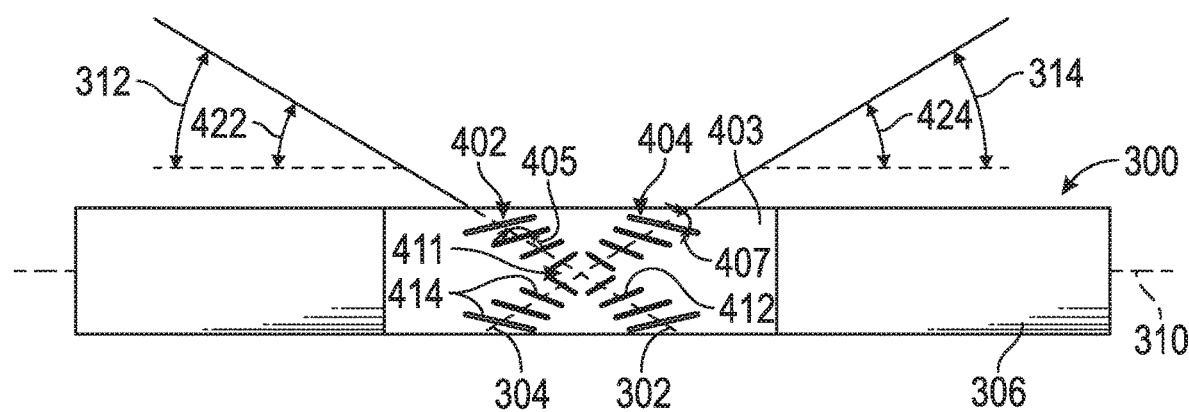
FIG. 4A illustrates the resistivity logging tool of FIG. 3A including an antenna shield positioned on the co-located loop antennas.

FIG. 4A illustrates the resistivity logging tool 300 having an antenna shield 403 positioned on the loop antennas 302 and 304 (illustrated in phantom). The antenna shield 403 includes a cross-slot shield design that defines a first set 402 of longitudinal slots 412 and a second set 404 of longitudinal slots 414 to facilitate electromagnetic transmissivity of the antenna shield 403 by providing areas where electromagnetic (EM) signals can penetrate the antenna shield 403 to be received or transmitted. In the illustrated embodiment, each slot 412 and 414 is formed in the shape of a rectangle, but could alternatively exhibit other shapes, without departing from the scope of the disclosure. Each slot 412, 414 is separated from an angularly adjacent slot 412, 414 by a separation gap. The separation gap may or may not be uniform between all angularly adjacent slots 412 and 414. The slots 412 cooperatively form a first discontinuous annular ring that extends about the circumference of the antenna shield 403. Similarly, the slots 414 cooperatively form a second discontinuous annular ring that extends about the circumference of the antenna shield 403. As illustrated, the length of the slots 412 and 414 increases in a direction angularly away from the point of intersection (generally indicated by 411) of the loop antennas 302 and 304

The antenna shield 403 provides a circumferential encapsulation of the loop antennas 302 and 304 by extending about the tool axis 310. More specifically, the antenna shield 403 is positioned radially outward from the loop antennas 302 and 304. As illustrated, the antenna shield 403 can axially span the axial length of the saddle 301 (FIG. 3A) and is secured to (or otherwise engages) the tool mandrel 306. In some embodiments, the antenna shield 403 may be designed such that a relatively smooth structural transition is achieved between the antenna shield 403 and the outer diameter of the tool mandrel 306 at the opposing axial ends of the antenna shield 403.

In some embodiments, the antenna shield 403 can be formed of a non-conductive and/or non-metallic material, such as fiberglass or a polymer (e.g., polyether ether ketone or "PEEK"). In other embodiments, however, the antenna shield 403 can be made of a conductive and/or metallic material, such as stainless steel, a nickel-based alloy (e.g., MONEL®, INCONEL®, etc.), a chromium-based alloy, a copper-based alloy, or any combination thereof.

The longitudinal slots 412 of the first set 402 may be arranged along and overlapping the radially adjacent loop antenna 302. The longitudinal slots 412 of the second set 404 may be arranged along and overlapping the radially adjacent loop antenna 304. The longitudinal slots 412, 414 are formed in the antenna shield 403 such that each longitudinal slot 412, 414 extends substantially perpendicular (indicated by respective slot angles 405 and 407) to the corresponding radially adjacent loop antenna 302, 304 at any given angular location about the circumference of the tool mandrel 306. Stated otherwise, each slot extends perpendicular to the winding angle of the radially adjacent loop antenna.

Figure 4B:
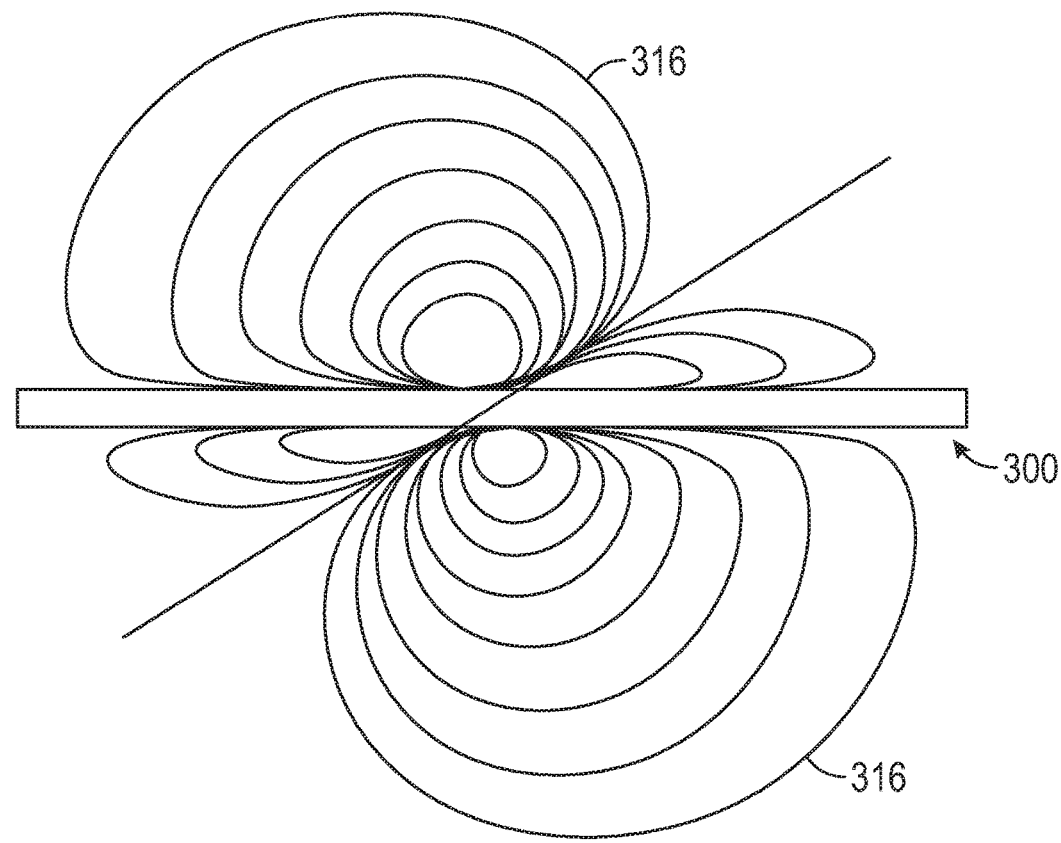
FIG. 4B illustrates the dipole EM field of one of the loop antennas in FIG. 4A in the presence of an antenna shield.
Figure 4C:
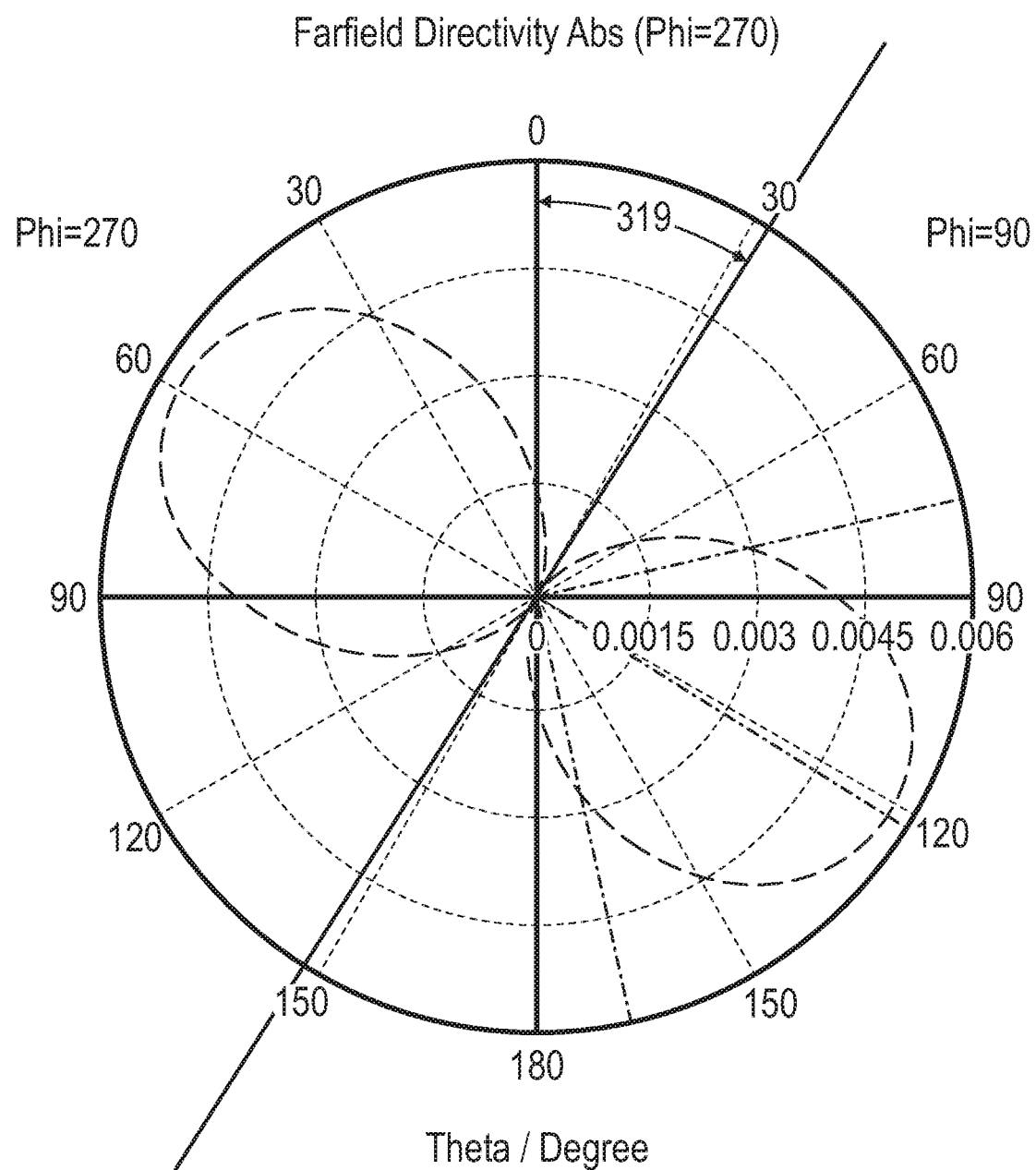
FIG. 4C is a graph illustrating a directionality of the dipole EM field in FIG. 4B.
Figure 4D:
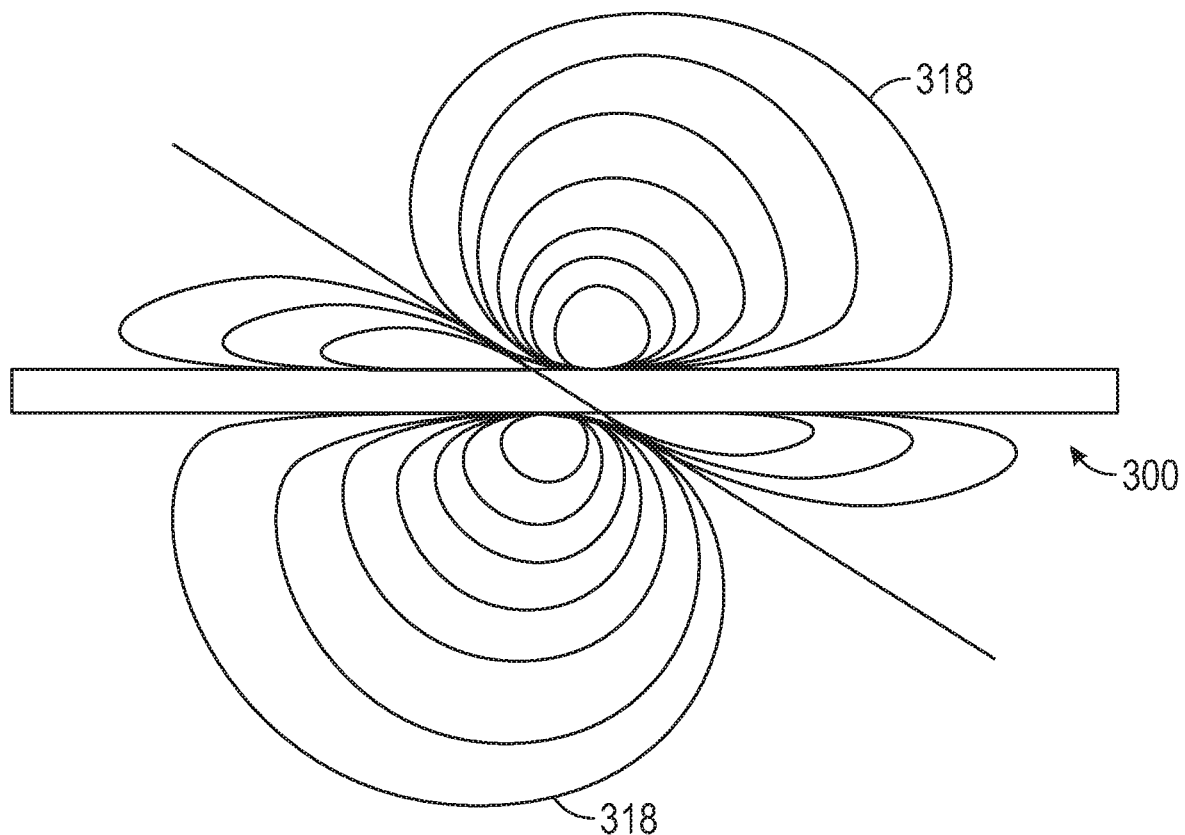
FIG. 4D illustrates the dipole EM field of the other loop antenna in FIG. 4A in the presence of the antenna shield.
Figure 4E:
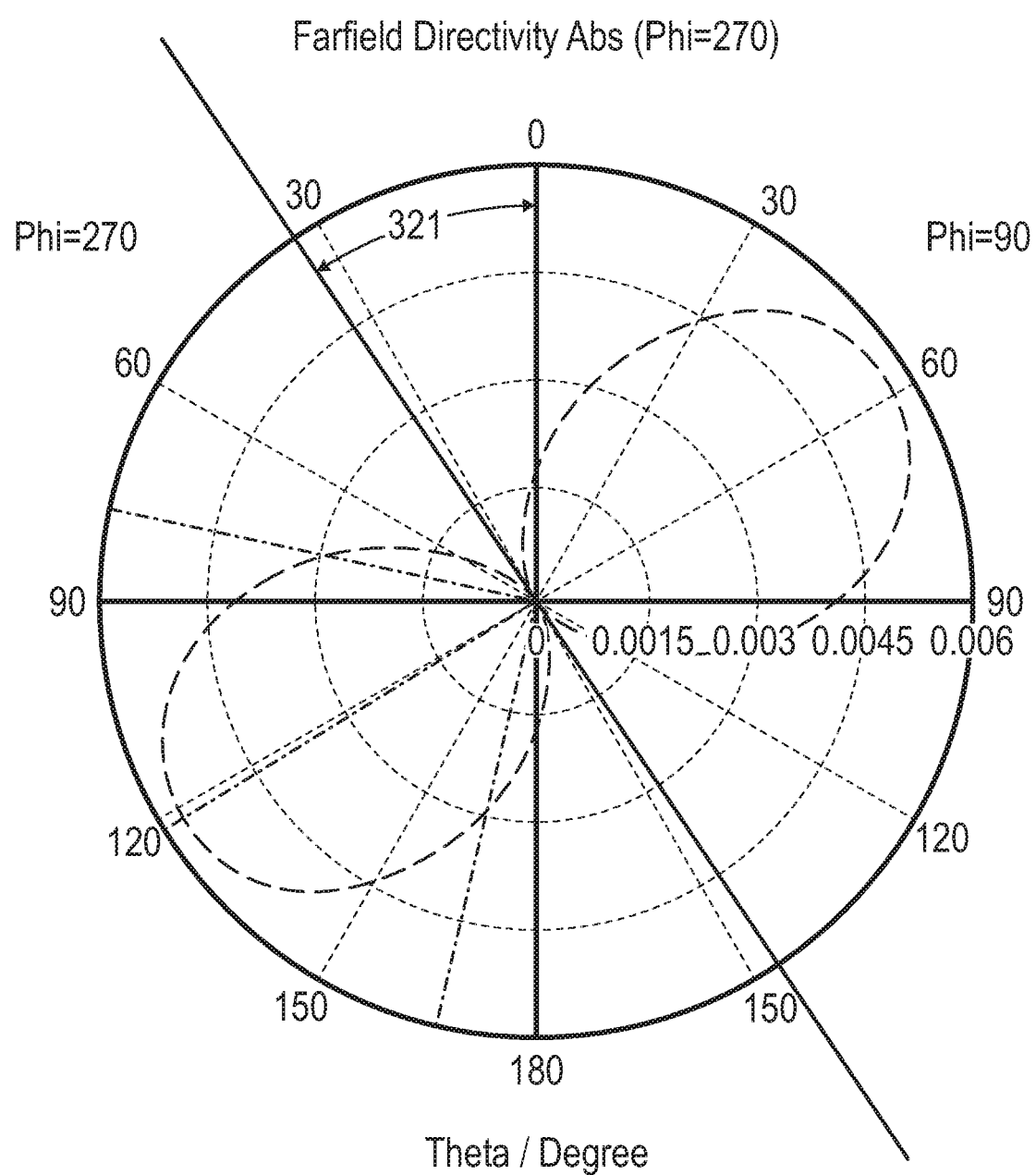
FIG. 4E is a graph illustrating a directionality of the dipole EM field in FIG. 4D.

FIG. 4B illustrates the dipole EM field 316 of the loop antenna 302 in the presence of the antenna shield 403. FIG. 4C is a graph illustrating a directionality of the dipole EM field 316 the presence of the antenna shield 403. FIG. 4D illustrates the dipole EM field 318 of the loop antenna 304 due to the presence of the antenna shield 403. FIG. 4E is a graph illustrating a directionality of the dipole EM field 318 in the presence of the antenna shield 403.

As illustrated, due to the antenna shield 403, the dipole EM fields 316 and 318 of the loop antennas 302 and 304, respectively, are distorted and the effective EM field angles 319 and 321 are reduced, compared to the dipole EM fields 316, 318 and effective EM field angles 319, 321 in FIGS. 3B-3E. The effective EM field angle 319 of the dipole EM field 316 is about 33°, which is substantially less than the effective EM field angle in FIG. 3C (in the absence of an antenna shield). The effective EM field angle 321 of the dipole EM field 318 is about 33°, which is substantially less than the effective EM field angle in FIG. 3E (in the absence of an antenna shield).

The distortion of the dipole EM field 316 (and 318), and the reduction of the effective EM field angle 319 (and 321) may be due to a portion of the EM field from the loop antenna 302 (and 304) radiating from the longitudinal slot 414 (and 412) of the loop antenna 304 (and 302), in addition to radiating from its corresponding longitudinal slot 412 (and 414). Because of leaking of the EM fields, the effective EM field angles 319 and 321 of both loop antennas 302 and 304 are reduced.

In order to minimize leakage of the dipole EM fields of the co-located antennas 302 and 304, embodiments disclosed may include the co-located loop antennas 302 and 304 disposed in a cross-slot bobbin that may be arranged or otherwise positioned about the tool mandrel 306. As a result, the co-located loop antennas 302 and 304 are isolated from each other by the cross-slot bobbin.

Figure 5A:
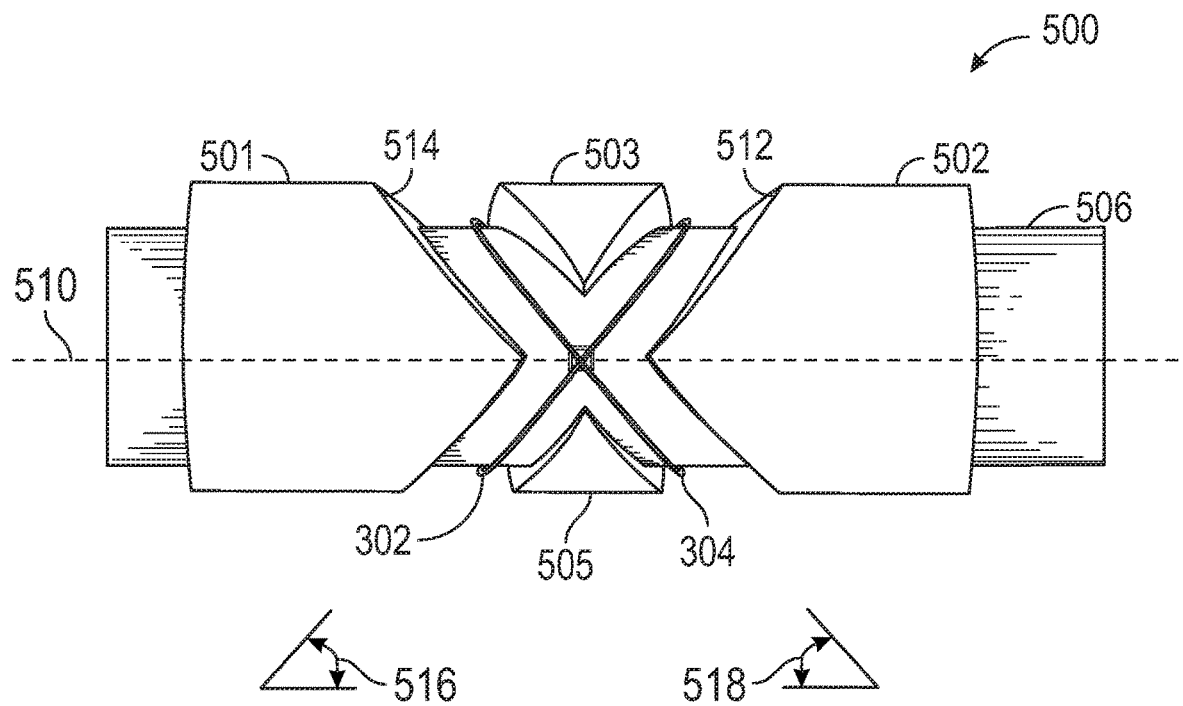
FIG. 5A illustrates a cross-slot bobbin positioned about the outer circumference of mandrel of a resistivity logging tool, according to embodiments disclosed.

FIG. 5A illustrates a cross-slot bobbin 502 positioned about the outer circumference of tool mandrel 506 of resistivity logging tool 500, according to one or more principles of the present disclosure. The resistivity logging tool 500 may be similar to the resistivity logging tool 126 (FIGS. 1 and 2) and therefore be used in the systems 100 and 200.

As illustrated, the cross-slot bobbin 502 is generally cylindrical body 501 that may be disposed or otherwise arranged about the tool mandrel 506. The cross-slot bobbin 502 includes a first cross slot 512 disposed in the body 501 at a first slot angle 516 offset relative to the tool axis 510, and a second cross slot 514 disposed in the body 501 at a second slot angle 518 offset relative to the tool axis 510 and opposite the first slot angle 516. Each slot 512 and 514 may be a recess or cavity that is defined in the body 501 of the cross-slot bobbin 502 and extending a certain distance radially inward from the outer circumferential surface of the body 501. The first and second slots 512 and 514 may intersect each other. Each slot 512 and 514 may be sized and shaped (or otherwise configured) to receive one of the loop antennas 302 and 304.

In an embodiment, and as illustrated, the first and second slot angles 516 and 518 may be about 45° (e.g., measured along the center of the slot) similar to the winding angles 312 and 314. However, in other embodiments, the first and second slot angles 516 and 518 may be any angle greater 0° and less than 90° that can accommodate loop antennas 302 and 304 having winding angles greater 0° and less than 90°.

Each slot 512 and 514 may have a same depth (e.g., measured from the outer circumferential surface of the body 501) and thus the loop antennas 302 and 304 may be disposed having substantially similar diameters. Alternatively, in other embodiments (see FIG. 7), the slots 512 and 514 may have different depths with one loop antenna having a different diameter than the other loop antenna.

The cross-slot bobbin 502 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The cross-slot bobbin 502 can be fabricated, for example, by additive manufacturing (i.e., 3D printing), molding, injection molding, machining, or other known manufacturing processes As illustrated, due to the slots 512 and 514, the cross-slot bobbin 502 may include two protrusions 503 and 505 extending radially outward from the body 501 of the cross-slot bobbin 502 and disposed radially opposite each other between the loop antennas 302 and 304. In an example, and as illustrated, the protrusions 503 and 505 may be wedge-shaped. The first and second slots 512 and 514 thus substantially isolate the loop antennas 302 and 304 from each other and, as a result, the EM fields from the loop antennas 302 and 304 are limited from interfering with each other, and cross-talk between the loop antennas 302 and 304 is minimized. It should be noted that the loop antennas 302 and 304 are coated or otherwise encapsulated with an insulating material and can thus be overlapping and contacting each other while current is flowing through each loop antenna.

Figure 5B:
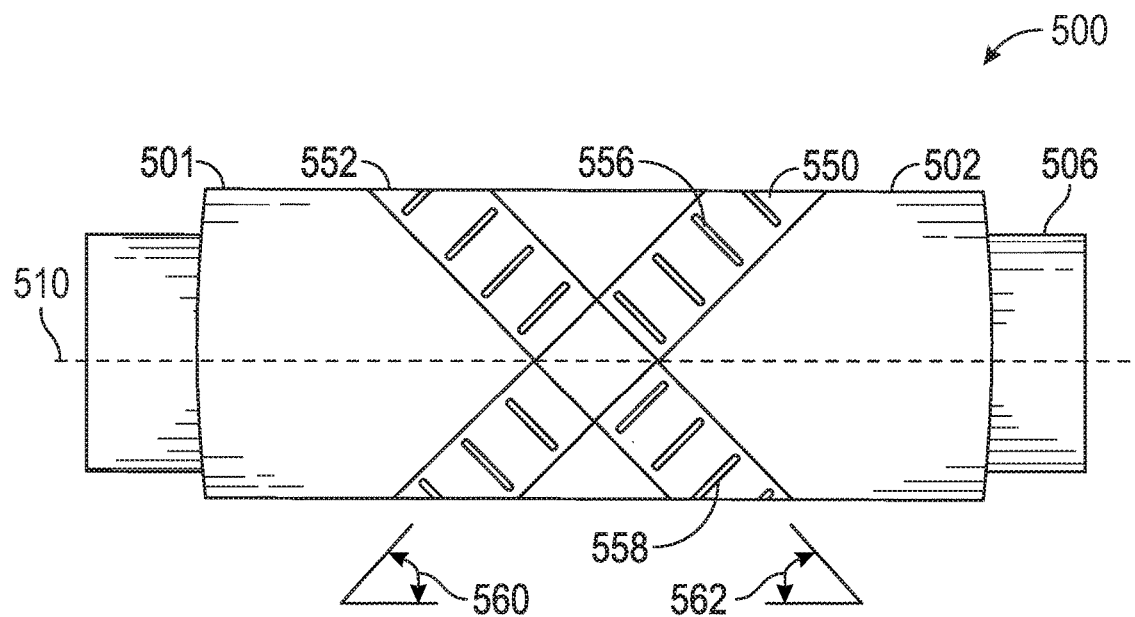
FIG. 5B illustrates the resistivity logging tool of FIG. 5A including antenna shields positioned in slots of the cross-slot bobbin, according to embodiments disclosed.

FIG. 5B illustrates the resistivity logging tool 500 including antenna shields 550 and 552 positioned in the slots 512 and 514 of the cross-slot bobbin 502. The antenna shield 550 may include a plurality of longitudinal shield slots 556 extending substantially perpendicular to the radially adjacent loop antenna 302 at any given angular location about the circumference of the tool mandrel 506. Similarly, the antenna shield 552 may include a plurality of longitudinal shield slots 558 extending substantially perpendicular to the radially adjacent loop antenna 304 at any given angular location about the circumference of the tool mandrel 506. In an example, each antenna shield 550 and 552 may be composed of two curved portions that are arranged in the respective slots 512 and 514. Each antenna shield 550 and 552 may thus be disposed at a corresponding shield angle 560 and 562 offset from the tool axis 510.

In some embodiments, the antenna shields 550 and 552 can be formed of a non-conductive and/or non-metallic material, such as fiberglass or a polymer (e.g., polyether ether ketone or "PEEK"). In other embodiments, however, the antenna shields 550 and 552 can be made of a conductive and/or metallic material, such as stainless steel, a nickel-based alloy (e.g., MONEL®, INCONEL®, etc.), a chromium-based alloy, a copper-based alloy, or any combination thereof.

Figure 5C:
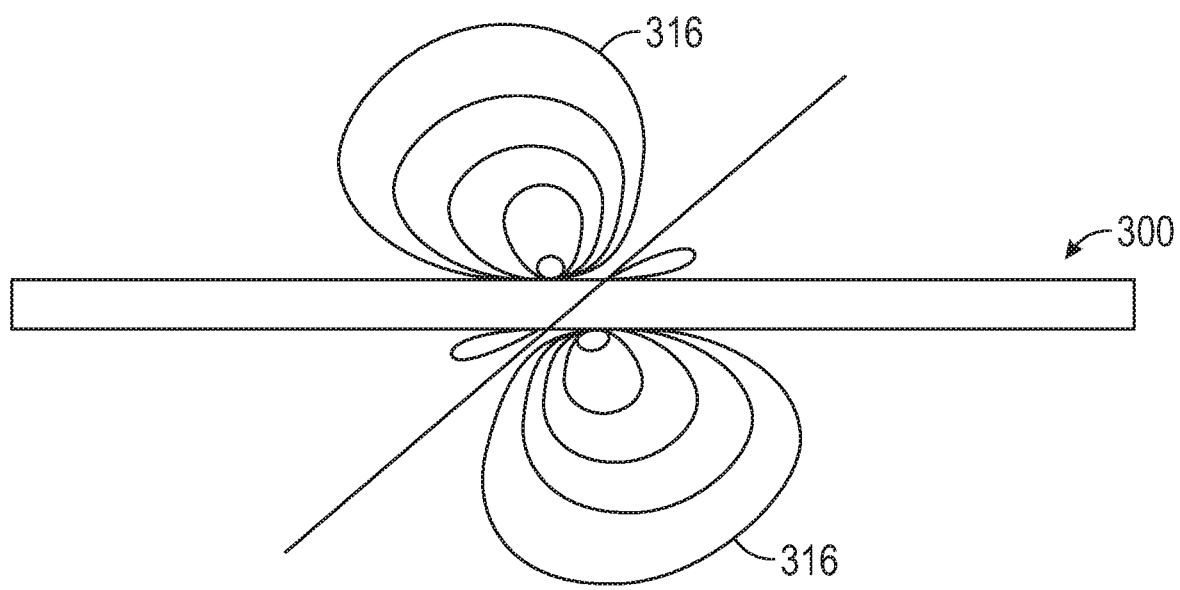
FIG. 5C illustrates the dipole EM field generated when current is passed through one of the loop antennas of the resistivity logging tool of FIG. 5B in the presence of the antenna shield.
Figure 5D:
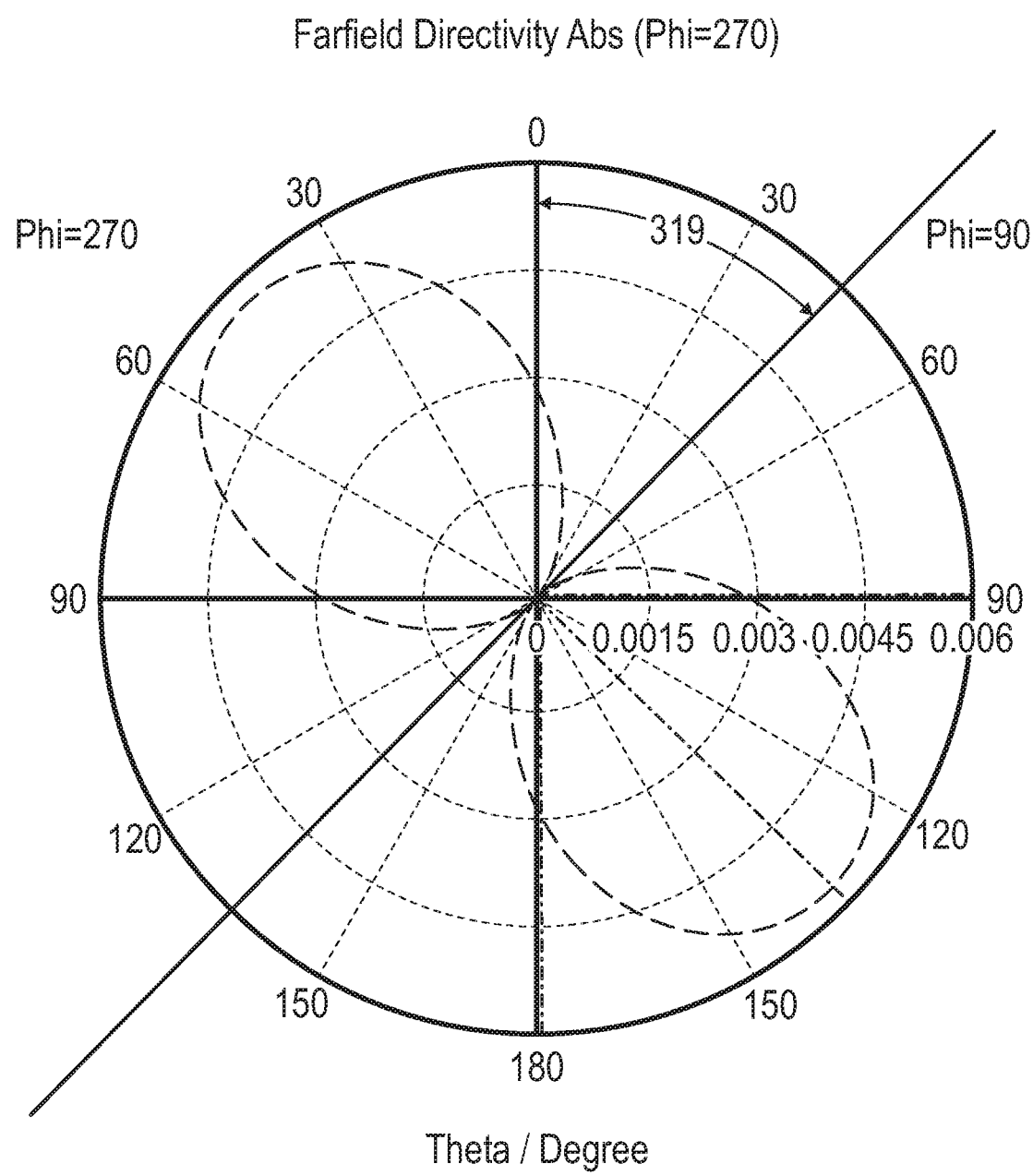
FIG. 5D is a graph illustrating the directionality of the dipole EM field of FIG. 5C.

FIG. 5C illustrates the dipole EM field generated when current is passed through loop antenna 302 of the resistivity logging tool 500 in the presence of the antenna shields 550 and 552. FIG. 5D is a graph illustrating the directionality of the dipole EM field of FIG. 5C. As illustrated in FIG. 5C, the distortion in the dipole EM field 576 (relative to the dipole EM field 316 in FIG. 4B) is substantially reduced. As illustrated in FIG. 5D, the effective EM field angle 579 of the dipole EM field 576 is about 45°. However, embodiments are not limited in this regard. In other embodiments, one or more of the first and second slot angles 516, 518, the winding angles 312, 314, the shield angles 560, 562, and the orientation of the shield slots 556, 558 relative to the corresponding loop antennae 302, 304 may be adjusted to obtain an effective EM field angle 579 of a desired value.

Figure 5E:
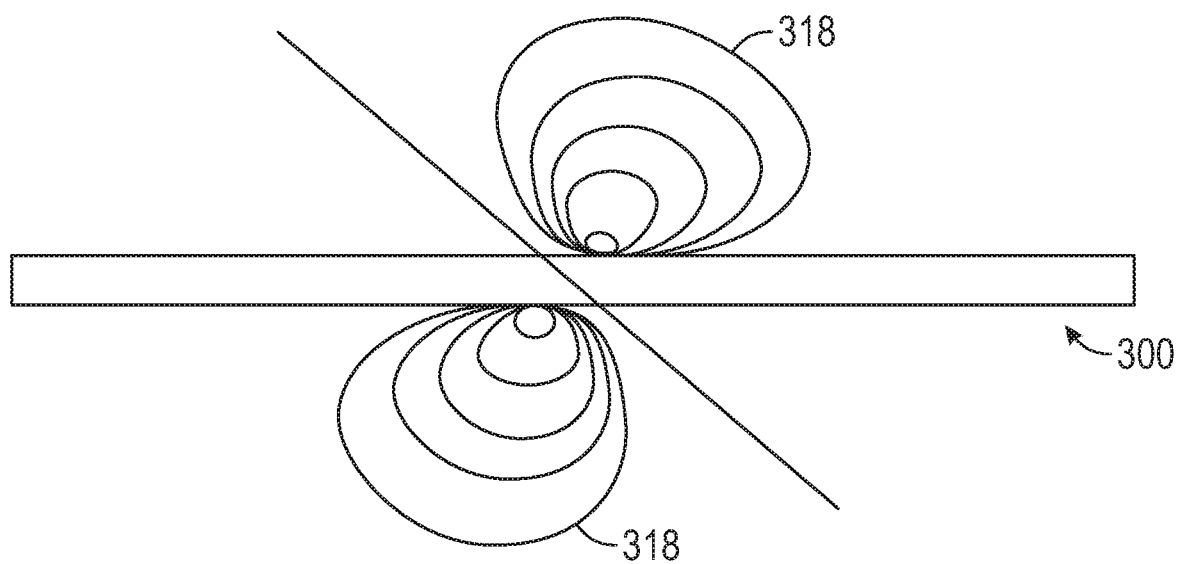
FIG. 5E illustrates the dipole EM field generated when current is passed through the other loop antenna of the resistivity logging tool of FIG. 5B in the presence of the antenna shield.
Figure 5F:
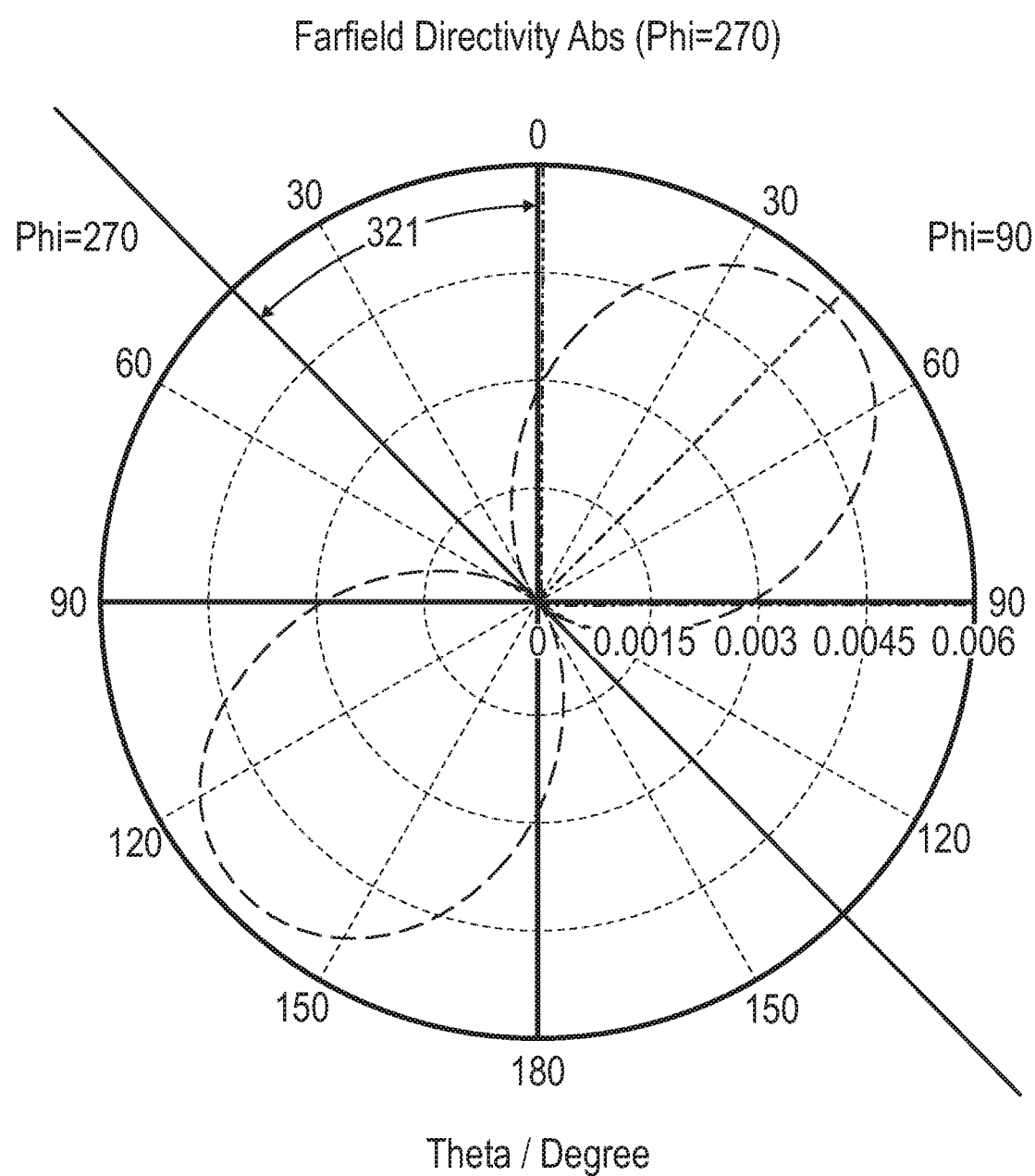
FIG. 5F is a graph illustrating the directionality of the dipole EM field of FIG. 5E.

FIG. 5E illustrates the dipole EM field generated when current is passed through loop antenna 304 of the resistivity logging tool 500 in the presence of the antenna shields 550 and 552. FIG. 5F is a graph illustrating the directionality of the dipole EM field of FIG. 5E. As illustrated in FIG. 5E, the distortion in the dipole EM field 578 (relative to the dipole EM field 318 in FIG. 4D) is substantially reduced. As illustrated in FIG. 5F, the effective EM field angle 581 of the dipole EM field 578 is about 45°. However, embodiments are not limited in this regard. In other embodiments, one or more of the first and second slot angles 516, 518, the winding angles 312, 314, the shield angles 560, 562, and the orientation of the shield slots 556, 558 relative to the corresponding loop antennae 302, 304 may be adjusted to obtain an effective EM field angle 581 of a desired value.

Figure 6:
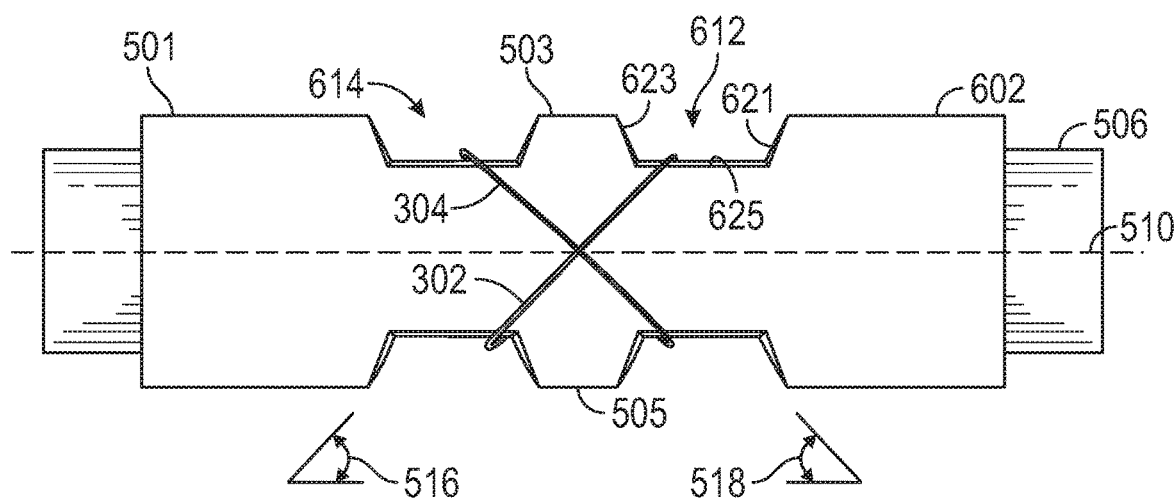
FIG. 6 illustrates a cross-sectional view of another cross-slot bobbin positioned about the outer circumference of the tool mandrel of the resistivity logging tool, according to one or more principles of the present disclosure.

FIG. 6 illustrates a cross-sectional view of a cross-slot bobbin 602 positioned about the outer circumference of the tool mandrel 506 of the resistivity logging tool 500, according to one or more principles of the present disclosure. The resistivity logging tool 500 may be similar to the resistivity logging tool 126 (FIGS. 1 and 2) and therefore be used in the systems 100 and 200. The cross-slot bobbin 602 may be similar in some respects to the cross-slot bobbin 502 of FIGS. 5A and 5B and, therefore, may be best understood with reference thereto, where like numerals represent like element not described again. As illustrated, the cross-slot bobbin 602 includes a first cross slot 612 disposed in the body 501 at a first slot angle 516 offset relative to the tool axis 510, and a second cross slot 614 disposed in the body 501 at a second slot angle 518 offset relative to the tool axis 510 and opposite the first slot angle 516. Each slot 612 and 614 may be a recess or cavity that is defined in the body 501 of the cross-slot bobbin 602 and extending a certain distance radially inward from the outer circumferential surface of the body 501. Each slot 612 and 614 may be wedge shaped having angled sidewalls 621 and 623 and a bottom surface 625 (forming the bottom of the recess). The first and second slots 612 and 614 may intersect each other. Each slot 612 and 614 may be sized and shaped (or otherwise configured) to receive one of the loop antennas 302 and 304.

Although not illustrated, antenna shield similar to the antenna shields 550 and 552 may be positioned in the slots 612 and 614 of the cross-slot bobbin 602. The antenna shields may be sized and shaped (or otherwise configured) to be received in the slots 612 and 614. Each antenna shield may include a plurality of longitudinal shield slots (similar to slots 556, 558) extending substantially perpendicular to the radially adjacent loop antenna 302, 304 at any given angular location about the circumference of the tool mandrel 506.

Figure 7:
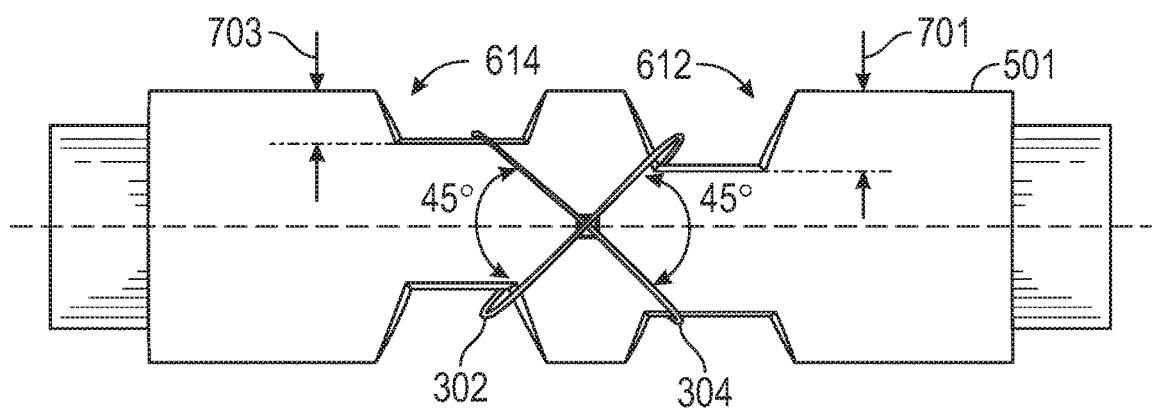
FIG. 7 illustrates a cross-sectional view of the cross-slot bobbin of FIG. 6 having cross slots having different depths, according to one or more principles of the present disclosure.

FIG. 7 illustrates a cross-sectional view of the cross-slot bobbin 602 having cross slots 612 and 614 having different depths, according to one or more principles of the present disclosure. As illustrated, the depth 701 of the slot 612 (e.g., measured from the outer circumferential surface of the body 501) is greater than the depth 703 of the slot 614. However, in other embodiments the slot 614 may have a depth greater than the slot 612. Because of the different depths, the loop antennas 302 and 304 are separated radially from each other and thus have different diameters. For instance, in FIG. 7, the diameter of the loop antenna 302 is less than the diameter of the loop antenna 304. In an embodiment, an interposer (e.g., a piece of fiber glass or similar) may be disposed between the loop antennas 302 and 304 where the loop antennas 302 and 304 intersect each other. It will be understood that the cross slots 512 and 514 of the cross-slot bobbin 502 may also be off different depths, similar to the cross-slots 612 and 614.

Embodiments disclosed herein include:

Embodiment A

A wellbore logging tool, comprising: a tool mandrel having a tool axis; a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis; a first loop antenna positioned in the first cross slot and including a first plurality of windings wrapped about the tool mandrel, wherein the first loop antenna is arranged in a first orientation and wherein portions of the first plurality of windings are wrapped about the tool mandrel at a first winding angle defined with respect to the tool axis; a second loop antenna co-located with the first loop antenna and positioned in the second cross slot, wherein the second loop antenna includes a second plurality of windings wrapped about the tool mandrel, the second loop antenna is arranged in a second orientation opposite the first orientation, and wherein portions of the second plurality of windings are wrapped about the tool mandrel at a second winding angle defined with respect to the tool axis; and an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas.

Embodiment B

A wellbore logging tool, comprising: a tool mandrel having a tool axis; a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis; a first loop antenna positioned in the first cross slot and including a first plurality of windings wrapped about the tool mandrel, wherein the first loop antenna is arranged in a first orientation, wherein portions of the first plurality of windings are wrapped about the tool mandrel at a first winding angle defined with respect to the tool axis, and wherein the first winding angle and the first slot angle are same; a second loop antenna co-located with the first loop antenna and positioned in the second cross slot, wherein the second loop antenna includes a second plurality of windings wrapped about the tool mandrel, the second loop antenna is arranged in a second orientation opposite the first orientation, wherein portions of the second plurality of windings are wrapped about the tool mandrel at a second winding angle defined with respect to the tool axis, and wherein the second winding angle and the second slot angle are same; and an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas.

Embodiment C

A method, comprising: introducing a wellbore logging tool into a wellbore, the wellbore logging tool including: a tool mandrel having a tool axis; a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis; a first loop antenna positioned in the first cross slot and including a first plurality of windings wrapped about the tool mandrel, wherein the first loop antenna is arranged in a first orientation and wherein portions of the first plurality of windings are wrapped about the tool mandrel at a first winding angle defined with respect to the tool axis; a second loop antenna co-located with the first loop antenna and positioned in the second cross slot, wherein the second loop antenna includes a second plurality of windings wrapped about the tool mandrel, the second loop antenna is arranged in a second orientation opposite the first orientation, and wherein portions of the second plurality of windings are wrapped about the tool mandrel at a second winding angle defined with respect to the tool axis; and an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas; and obtaining measurements of a surrounding subterranean formation with the wellbore logging tool.

Each of embodiments A, B, and C may have one or more of the following additional elements in any combination. Element 1: wherein the first and second cross slots have a same depth. Element 2: wherein the first and second cross slots have different depths. Element 3: wherein the bobbin includes two protrusions extending radially outward and disposed between the first and second loop antennas opposite each other. Element 4: wherein the first slot angle is same as the second slot angle. Element 5: wherein the first and second cross slots are configured such that an effective field angle of a dipole electromagnetic (EM) field of the first loop antenna is about 45°. Element 6: wherein the first and second cross slots are configured such that an effective field angle of a dipole electromagnetic (EM) field of the second loop antenna is about 45°. Element 7: wherein the first and second loop antennas are concentric. Element 8: wherein the first and second loop antennas are eccentric. Element 9: wherein the first winding angle is same as the second winding angle. Element 10: wherein the first winding angle and the second winding angle are 45°. Element 11: wherein the shield slots of each antenna shield are perpendicular to the radially adjacent loop antenna.

Element 12: wherein the tool mandrel is operatively coupled to a drill string and introducing the wellbore logging tool into the wellbore further comprises: extending the wellbore logging tool into the wellbore on the drill string; and drilling a portion of the wellbore with a drill bit secured to a distal end of the drill string. Element 13: wherein introducing the wellbore logging tool into the wellbore further comprises extending the wellbore logging tool into the wellbore on wireline as part of a wireline instrument sonde. Element 14: wherein the first and second cross slots are each configured such that an effective field angle of a dipole electromagnetic (EM) field of each of the first and second loop antennas is about 45°. Element 15: wherein the shield slots of each antenna shield are perpendicular to the radially adjacent loop antenna.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wellbore logging tool, comprising:
   a tool mandrel having a tool axis;
   a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis;
   a first loop antenna positioned in the first cross slot and including a first plurality of windings wrapped about the tool mandrel, wherein the first loop antenna is arranged in a first orientation and wherein portions of the first plurality of windings are wrapped about the tool mandrel at a first winding angle defined with respect to the tool axis;
   a second loop antenna co-located with the first loop antenna and positioned in the second cross slot, wherein the second loop antenna includes a second plurality of windings wrapped about the tool mandrel, the second loop antenna is arranged in a second orientation opposite the first orientation, and wherein portions of the second plurality of windings are wrapped about the tool mandrel at a second winding angle defined with respect to the tool axis; and
   an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas, wherein an intersection of a first antenna shield and a second antenna shield does not include a shield slot.

2. The wellbore logging tool of claim 1, wherein the first and second cross slots have a same depth.

3. The wellbore logging tool of claim 1, wherein the first and second cross slots have different depths.

4. The wellbore logging tool of claim 1, wherein the bobbin includes two protrusions extending radially outward and disposed between the first and second loop antennas opposite each other.

5. The wellbore logging tool of claim 1, wherein the first slot angle is same as the second slot angle.

6. The wellbore logging tool of claim 1, wherein the first and second cross slots are configured such that an effective field angle of a dipole electromagnetic (EM) field of the first loop antenna is about 45°.

7. The wellbore logging tool of claim 1, wherein the first and second cross slots are configured such that an effective field angle of a dipole electromagnetic (EM) field of the second loop antenna is about 45°.

8. The wellbore logging tool of claim 1, wherein the first and second loop antennas are concentric.

9. The wellbore logging tool of claim 1, wherein the first and second loop antennas are eccentric.

10. The wellbore logging tool of claim 1, wherein the first winding angle is same as the second winding angle.

11. The wellbore logging tool of claim 1, wherein the first winding angle and the second winding angle are 45°.

12. The wellbore logging tool of claim 1, wherein the shield slots of each antenna shield are perpendicular to the radially adjacent loop antenna.

13. A wellbore logging tool, comprising:
a tool mandrel having a tool axis;
a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis;
a first loop antenna positioned in the first cross slot and including a first plurality of windings wrapped about the tool mandrel, wherein the first loop antenna is arranged in a first orientation, wherein portions of the first plurality of windings are wrapped about the tool mandrel at a first winding angle defined with respect to the tool axis, and wherein the first winding angle and the first slot angle are same;
a second loop antenna co-located with the first loop antenna and positioned in the second cross slot, wherein the second loop antenna includes a second plurality of windings wrapped about the tool mandrel, the second loop antenna is arranged in a second orientation opposite the first orientation, wherein portions of the second plurality of windings are wrapped about the tool mandrel at a second winding angle defined with respect to the tool axis, and wherein the second winding angle and the second slot angle are same; and
an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas, wherein an intersection of a first antenna shield and a second antenna shield does not include a shield slot.

14. The wellbore logging tool of claim 13, wherein the first and second cross slots have a same depth.

15. The wellbore logging tool of claim 13, wherein the first and second cross slots have different depths.

16. The wellbore logging tool of claim 13, wherein the bobbin includes two protrusions extending radially outward and disposed between the first and second loop antennas opposite each other.

17. The wellbore logging tool of claim 13, wherein the shield slots of each antenna shield are perpendicular to the radially adjacent loop antenna.

18. A method, comprising:
introducing a wellbore logging tool into a wellbore, the wellbore logging tool including:
a tool mandrel having a tool axis;
a bobbin positioned about the circumference of the tool mandrel, wherein the bobbin defines a first cross slot disposed in the bobbin at a first slot angle and a second cross slot disposed in the bobbin at a second slot angle opposite the first slot angle, wherein the first and second cross slots intersect each other, and the first and second slot angles are defined with respect to the tool axis;
a first loop antenna positioned in the first cross slot and including a first plurality of windings wrapped about the tool mandrel, wherein the first loop antenna is arranged in a first orientation and wherein portions of the first plurality of windings are wrapped about the tool mandrel at a first winding angle defined with respect to the tool axis;
a second loop antenna co-located with the first loop antenna and positioned in the second cross slot, wherein the second loop antenna includes a second plurality of windings wrapped about the tool mandrel, the second loop antenna is arranged in a second orientation opposite the first orientation, and wherein portions of the second plurality of windings are wrapped about the tool mandrel at a second winding angle defined with respect to the tool axis; and
an antenna shield secured to the tool mandrel and positioned in each of the first and second cross slots, wherein each antenna shield is positioned radially outward from corresponding first and second loop antennas and includes a plurality of shield slots arranged along the corresponding first and second loop antennas and overlapping the corresponding first and second loop antennas, wherein an intersection of a first antenna shield and a second antenna shield does not include a shield slot; and
obtaining measurements of a surrounding subterranean formation with the wellbore logging tool.

19. The method of claim 18, wherein the tool mandrel is operatively coupled to a drill string and introducing the wellbore logging tool into the wellbore further comprises:
extending the wellbore logging tool into the wellbore on the drill string; and
drilling a portion of the wellbore with a drill bit secured to a distal end of the drill string.

20. The method of claim 18, wherein introducing the wellbore logging tool into the wellbore further comprises extending the wellbore logging tool into the wellbore on wireline as part of a wireline instrument sonde.

21. The method of claim 18, wherein the first and second cross slots are each configured such that an effective field angle of a dipole electromagnetic (EM) field of each of the first and second loop antennas is about 45°.

22. The method of claim 18, wherein the shield slots of each antenna shield are perpendicular to the radially adjacent loop antenna.

* * * * *